(12) United States Patent
Kurooka et al.

(10) Patent No.: US 6,997,620 B2
(45) Date of Patent: Feb. 14, 2006

(54) OPTICAL PLUG AND MOUNTING METHOD THEREOF

(75) Inventors: Kazuma Kurooka, Aichi (JP); Masataka Nishiura, Aichi (JP)

(73) Assignee: J.S.T. Mfg. Co., Ltd., Osaka (JP)

(*) Notice: Subject to any disclaimer, the term of this patent is extended or adjusted under 35 U.S.C. 154(b) by 6 days.

(21) Appl. No.: 10/882,334

(22) Filed: Jul. 2, 2004

(65) Prior Publication Data
US 2005/0031270 A1    Feb. 10, 2005

(30) Foreign Application Priority Data
Jul. 3, 2003    (JP) ............................. 2003-191163

(51) Int. Cl.
    *G02B 6/36*    (2006.01)
(52) U.S. Cl. ............................. 385/78; 385/60; 385/72
(58) Field of Classification Search .................. 385/53, 385/56, 60, 65–68, 72, 76–78, 86, 87
    See application file for complete search history.

(56) References Cited

U.S. PATENT DOCUMENTS 6,402,392 B1 * 6/2002 Yarita et al. ............... 385/78 X

FOREIGN PATENT DOCUMENTS

| JP | 08-094877 A | 4/1996 |
|---|---|---|
| JP | 08-220380 A | 8/1996 |
| JP | 11-002744 A | 1/1999 |
| JP | 2001-141960 A | 5/2001 |
| JP | 2001-228341 A | 8/2001 |
| JP | 2002-162537 A | 6/2002 |
| JP | 2003-139995 A | 5/2003 |

* cited by examiner

Primary Examiner—Phan T. H. Palmer
(74) Attorney, Agent, or Firm—Rader, Fishman & Grauer PLLC (57) ABSTRACT

The optical plug includes a ferule, adapter housing, a plug body, a compression coil spring and a compression bonding sleeve. The plug body includes a projecting portion and an extending portion which is provided with a plurality of annular grooves. The compression bonding sleeve includes a crimp portion and a support portion. According to the present invention, the diameter of the crimp portion is uniformly narrowed so that the crimp portion compression-bonds the high tensile strength wires to the annular grooves of the extending portion. Accordingly, it is possible to maintain the deformation of the crimp portion within the limit of its plastic deformation and hence, the occurrence of cracks and rupture can be prevented, so that the optical plug can be miniaturized. Further, it is possible to mount the optical fiber cable to the optical plug at a low cost.

4 Claims, 8 Drawing Sheets

OPTICAL PLUG AND MOUNTING METHOD THEREOF

CROSS-REFERENCE TO RELATED APPLICATIONS

This application is based upon and claims the benefit of priority from the prior Japanese Patent Application No. 2003-191163 filed on Jul. 3, 2003, the entire contents of which is incorporated herein by reference.

FIELD OF THE INVENTION

The present invention relates to an optical plug and a method for mounting the optical plug on an optical fiber cable.

BACKGROUND OF THE INVENTION

Conventionally, a transfer method adopting an optical fiber system has been spreading. An optical fiber cable which is used in such an optical transmission has been widely used for information instrument, CATV, broadcasting equipment, an optical measuring device, LAN equipment and the like.

An optical plug is mounted on an end portion of the optical fiber cable. The optical plug includes, for example, an optical fiber holding member, a caulking seat, a compression coil spring, a stopper ring and a plug frame (see Japanese Unexamined Patent Publication 2001-141960, for example). On an inner wall surface of a caulking ring, a female-thread-like projections are formed, for example.

According to the optical plug, the optical fiber cable is inserted into the inside of the caulking seat and, at the same time, high tensile strength wires (for example, aramid fibers) are arranged outside the caulking seat. Thereafter, by caulking the caulking seat with the caulking ring from the outside, the high tensile strength wires can be clamped between the caulking seat and the caulking ring. As a result, the high tensile strength wires are firmly held by the caulking seat and the caulking ring.

However, the above-mentioned optical plug, since the female threads are formed in the inner wall surface of the caulking ring, it is difficult to achieve the further miniaturization of the optical plug.

To overcome the above-mentioned drawbacks, there has been proposed a method in which an annular groove is formed in an outer periphery of the caulking seat, thus forming depressions and projections, and at the same time, an annular projection is formed on the caulking ring, and the annular projection is fitted into the annular groove formed in the caulking seat.

However, according to the method, it is necessary to form the annular projection in a die which presses the caulking ring. Accordingly, a height of the projection from a bottom surface is 0.3 mm, for example, and hence, it is necessary to machine the dies with extreme accuracy, thus pushing up cost.

SUMMARY OF THE INVENTION

The present invention has been made to overcome the above-mentioned drawbacks and it is an object of the present invention to provide an optical plug which enables the mounting of an optical fiber cable at a low cost and can realize the miniaturization and a mounting method thereof.

The inventors, to achieve the above-mentioned object, have invented following novel optical plug and mounting method thereof.

(1) An optical plug for being mounted to an optical fiber cable including a fiber, a core wire which covers the fiber, high tensile strength wires which cover the core wire and an outer sheath which covers the high tensile strength wires, the optical plug comprising: a tubular ferule which holds the fiber and the core wire of the optical fiber cable such that the fiber of the optical fiber cable is exposed from a distal end of the ferule; a tubular adapter housing in which the distal end of the ferule is inserted; a tubular plug body which includes a projecting portion which is inserted into the inside of the adapter housing and an extending portion in which a plurality of annular grooves are formed and which is covered with the high tensile strength wires of the optical fiber cable; a compression coil spring which is formed in the inside of the projecting portion of the plug body and biases the ferule toward the adapter housing;

a tubular compression bonding sleeve which includes a crimp portion which covers the extending portion of the plug body from above the high tensile strength wires of the optical fiber cable and a support portion provided at a proximal end side of the crimp portion; wherein the diameter of the crimp portion is uniformly narrowed, and the high tensile strength wires of the optical fiber cable are compression-bonded to the annular grooves of the extending portion of the plug body.

The optical plug is a square type optical plug which conforms with the specifications of an LC-type optical plug which constitutes a jumper connector, for example.

According to the invention having the above-mentioned constitution (1), a pair of dies forming an approximately cone-shaped insertion hole is used. By opening the dies, the dies are arranged such that the annular grooves of the extending portion are located at the small-diameter side of the insertion hole. Thereafter, by closing the pair of dies, the diameter of the crimp portion is narrowed so that the crimp portion compression-bonds the high tensile strength wires to the extending portion of the plug body.

In this manner, since the diameter of the crimp portion is narrowed and the crimp portion is deformed plastically, the high tensile strength wires are clamped between the inside of the crimp portion and the outside of the extending portion. Here, the diameter of the crimp portion is uniformly narrowed within the limit of the plastic deformation. Accordingly, it is possible to maintain the degree of deformation of the crimp portion within the limit of the crimp portion's plastic deformation and hence, it is possible to prevent the occurrence of cracks and rupture and the optical plug can be miniaturized.

Further, since it is sufficient to merely form an approximately cone-shaped insertion hole in the pair of dies, it is unnecessary to form the conventional annular projections and hence, the optical fiber cable can be mounted on the optical plug at a low cost.

(2) An optical plug mounting method for mounting an optical plug on an optical fiber cable including a fiber, a core wire which covers the fiber, high tensile strength wires which cover the core wire and an outer sheath which covers the high tensile strength wires, wherein the optical plug includes: a tubular ferule which holds the fiber and the core wire of the optical fiber cable such that the fiber of the optical fiber cable is exposed from the distal end of the ferule; a tubular adapter housing in which the distal end of the ferule is inserted; a tubular plug body which includes a projecting portion which is inserted into the inside of the adapter housing and an extending portion in which a plurality of annular grooves are formed and is which is covered with the high tensile strength wires of the optical fiber cable; a compression coil spring which is formed in the inside of the projecting portion of the plug body and biases the ferule toward the adapter housing; a tubular compression bonding sleeve which includes a crimp portion which covers the extending portion of the plug body from above the high tensile strength wires of the optical fiber cable and a support portion provided at the proximal end side of the crimp portion; wherein a pair of dies having an cone-shaped insertion hole is used, the dies are opened, the annular grooves of the extending portion are disposed at the small-diameter side of the insertion hole and, thereafter, by closing the pair of dies, the diameter of the crimp portion is narrowed so that the crimp portion compression-bonds the high tensile strength wires to the extending portion of the plug body.

(3) In the optical plug mounting method according to (2), wherein the outer diameter and inner diameter of the crimp portion of the compression spring are respectively 3.7 mm and 3.3 mm, the outer diameter of the extending portion of the plug body is 3.1 mm, and the outer diameter of the annular grooves is 2.8 mm, and with the pair of dies, the outer diameter of the crimp portion of the compression bonding sleeve is narrowed to at least 3.1 mm.

(4) In the optical plug mounting method according to (2) or (3), wherein a gradient angle of an inner surface of the insertion hole of the dies is approximately 10 degrees.

DETAILED DESCRIPTION OF THE PREFERRED EMBODIMENT

One embodiment of the present invention is explained hereinafter in conjunction with drawings.

Figure 1A:
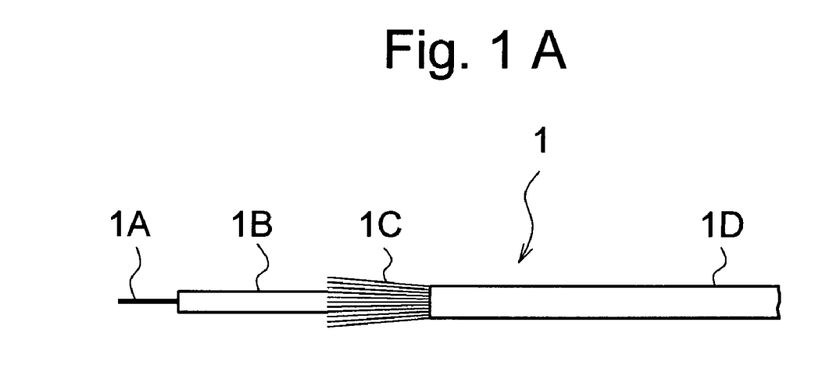
FIG. 1A is a side view of an optical fiber cable according to one embodiment of the present invention.

FIG. 1A is a side view of an optical fiber cable 1 according to this embodiment.

The optical fiber cable 1 includes a fiber 1A which is constituted of a core and a clad, a core wire 1B which covers the fiber 1A, high tensile strength wires 1C which cover the core wire 1B and an outer sheath 1D which covers the high tensile strength wires 1C.

The core wire 1B is provided for protecting and reinforcing the fiber 1A and is formed of a nylon pipe, for example.

The high tensile strength wires 1C are formed of a large number of fibers such as aramid fibers. The high tensile strength wires 1C are formed of KEVLAR (a registered trade mark), for example.

With respect to the optical fiber cable 1, to mount an optical plug 2 described later to this optical fiber cable 1, the fiber 1B, the high tensile strength wires 1C and the outer sheath 1D are cut to a given length and the fiber 1A, the core wire 1B, the high tensile strength wires 1C and the outer sheath 1D are respectively exposed.

Figure 1B:
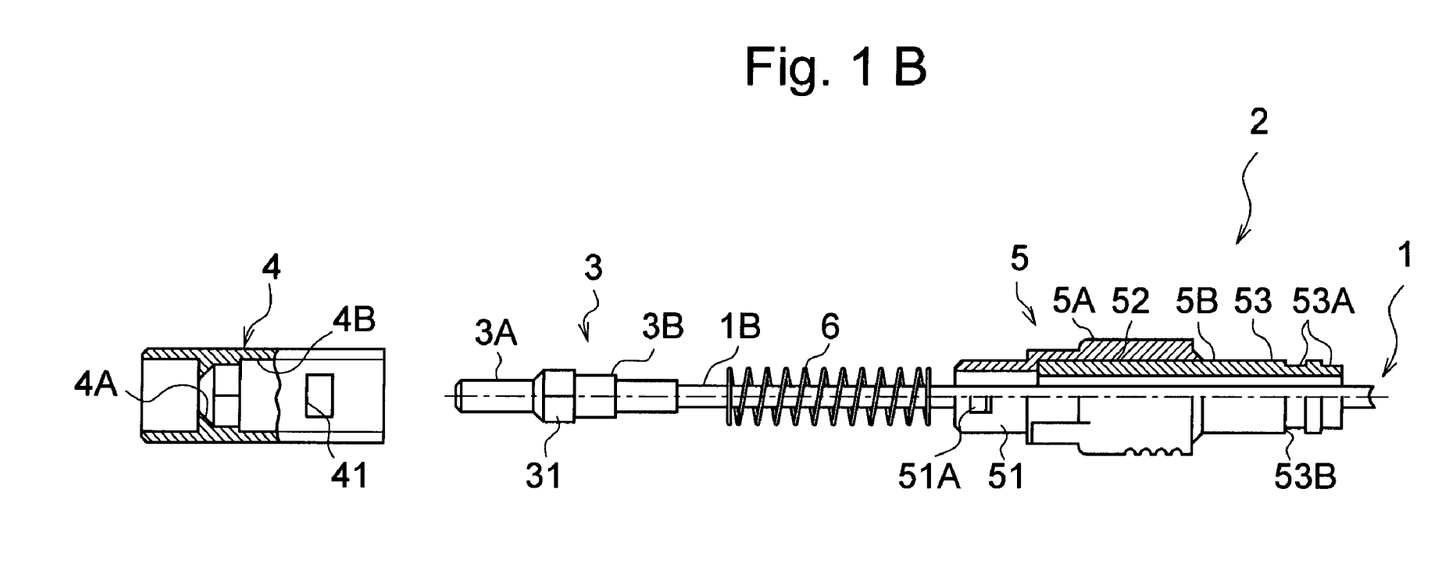
FIG. 1B is an exploded view of a distal end side of an optical plug which is mounted on the optical fiber cable according to the embodiment.
Figure 1C:
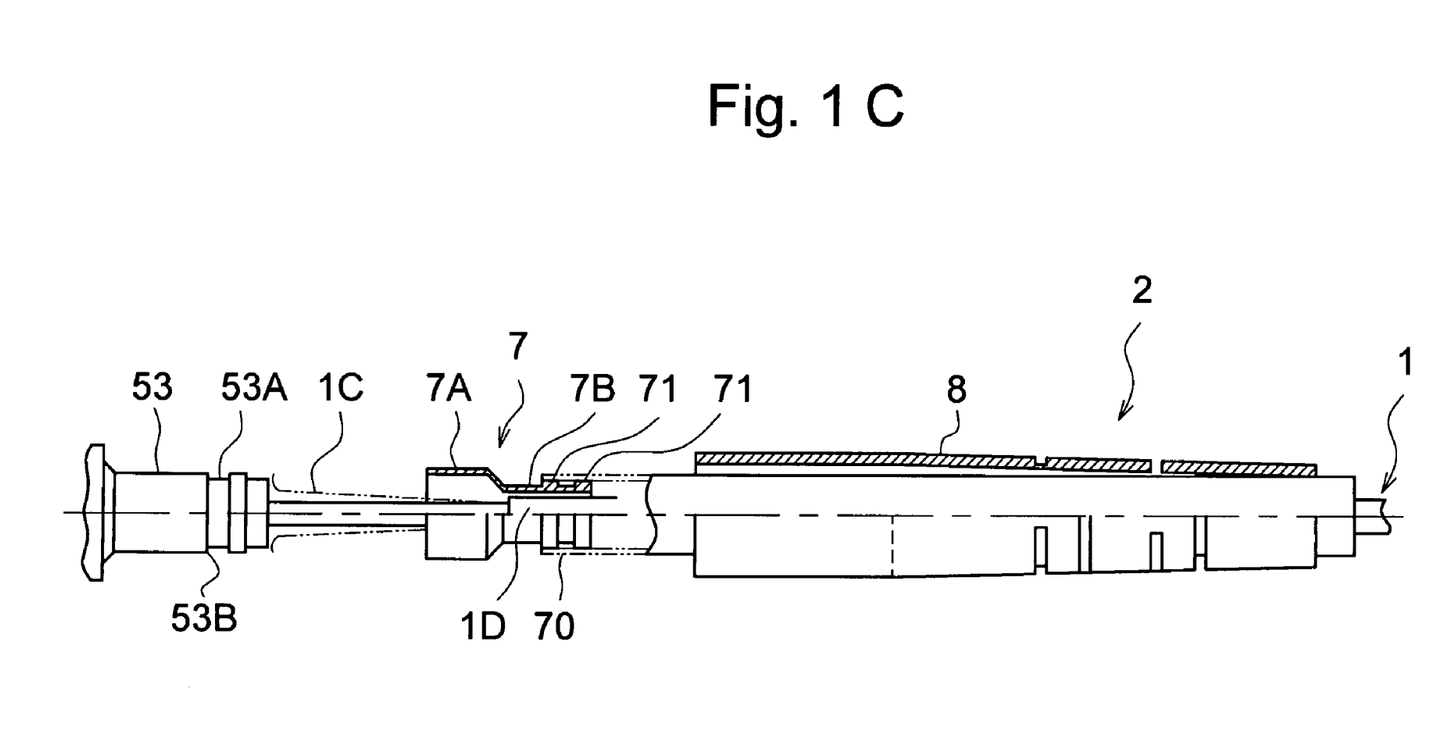
FIG. 1C is an exploded view of a proximal end side of the optical plug according this embodiment.

FIG. 1B is an exploded view of a distal end side of the optical plug 2 which is mounted on the optical fiber cable 1, and FIG. 1C is an exploded view of a proximal end side of the optical plug 2. Here, in FIG. 1B and FIG. 1C, parts which constitute the optical plug 2 are shown in a partially overlapped manner.

The optical plug 2 includes a tubular ferule 3 which holds the fiber 1A and the core wire 1B of the optical fiber cable 1, a tubular adapter housing 4 in which a distal end of the ferule 3 is inserted, a tubular plug body 5 which is inserted into the inside of the adapter housing 4, a compression coil spring 6 which is formed in the inside of a distal end side of the plug body 5 and biases the ferule 3 toward the adapter housing 4, and a tubular compression bonding sleeve 7 which covers the distal end side of the plug body 5 from above the high tensile strength wires 1C of the fiber cable 1.

The ferule 3 is configured to include a ferule body 3A which holds the fiber 1A of the optical fiber cable 1 such that the fiber 1A is exposed from the distal end of the optical fiber cable 1, and a ferule holding portion 3B into which the ferule body A is pressfitted and which holds the distal end of the core wire 1B.

The ferule body 3A has an approximately cylindrical shape and is formed of synthetic resin. A distal end surface of the ferule body 3A is polished.

The ferule holding portion 3B has an approximately cylindrical shape and is made of metal. A flange portion 31 which projects outwardly is formed on the distal end side of the ferule holding portion 3B. The flange portion 31 has its proximal end side formed in a hexagonal shape and its distal end side formed in a conical shape. The flange portion 31 is fitted into a fitting hole 4A of the adapter housing 4 described later.

The optical fiber cable 1 is inserted into the above-mentioned ferule 3 and the fiber 1A and the core wire 1B of the optical fiber cable 1 are fixed to the inside of the ferule 3.

The adapter housing 4 has a quadrangular sleeve-like shape and is formed of synthetic resin. In the inside of the adapter housing 4, a housing portion 4B which houses the ferule 3 is formed. The housing portion 4B includes the fitting hole 4A into which the flange portion 31 of the ferule 3 is fitted.

The fitting hole 4A has, corresponding to the flange portion 31, its proximal end formed in a hexagonal shape and its distal end formed in a cone shape. Accordingly, the adapter housing 4 restricts the movement of the ferule 3 which is biased toward the distal end by the compression coil spring 6 toward the axial distal end side and, at the same time, prevents the rotation of the ferule 3.

On both side surfaces of the adapter housing 4, a pair of indents 41 which are communicated with the housing portion 4B are formed. Detents 51A described later of a plug body are fitted into these indents 41 so as to connect the adapter housing 4 and the plug body 5.

The plug body 5 includes a plug housing 5A having a quadrangular shape and a cylindrical stop ring 5B which has its distal end housed in the inside of the plug housing 5A.

The plug housing 5A is formed of synthetic resin. On the distal end of the plug housing 5A, a projecting portion 51 which is inserted into the housing portion 4B of the adapter housing 4 is formed.

On both side surfaces of the projecting portion 51 of the plug housing 5A, detents 51A which are fitted into the above-mentioned indents 41 are formed.

The stop ring 5B is made of metal and includes a press-fitting portion 52 which is press-fitted into the plug housing 5A and an extending portion 53 which extends from the press-fitting portion 52 to the proximal end and is exposed from the plug housing 5A.

Two annular grooves 53A are formed on the proximal end side of the extending portion 53 of the stop ring 5B. Due to the provision of these annular grooves 53A, a stepped portion 53B to which the crimp portion 7A described later is compression-bonded is formed on an outer periphery of the extending portion 53.

Here, the extending portion 53 of the stop ring 5B is covered with the high tensile strength wires 1C of the optical fiber cable 1, wherein the high tensile strength wires 1C are compression-bonded to the extending portion 53 using the crimp portion 7A of the compression bonding sleeve 7.

The compression coil spring 6 is housed in the housing portion 4B of the adapter housing 4 and is arranged between the stop ring 5B of the plug body 5 and the flange portion 31 of the ferule 3.

The compression coil spring 6 is engaged with a distal end surface of the stop ring 5B of the plug body 5 and biases the flange portion 31 of the ferule 3 to a distal end side, that is, toward the adapter housing 4.

The compression sleeve 7 includes the crimp portion 7A which covers the extending portion 53 of the plug body 5 and a support portion 7B which has a diameter smaller than a diameter of the crimp portion 7A and which is provided to the proximal end side of the crimp portion 7A.

The crimp portion 7A covers the extending portion 53 of the stop ring 5B from above the high tensile strength wires 1C of the optical fiber cable 1 and clamps the high tensile strength wires 1C between the extending portion 53 and itself.

The support portion 7B includes two annular projections 71 at the proximal end side, thus forming projections and depressions of the outer peripheral surface of the support portion 7B. The distal end of the heat shrinking tube 70 is mounted on the outer peripheral surface of the support portion 7B.

The boot 8 has a cylindrical shape and covers the outer peripheral surface of the compressing bonding sleeve 7.

The ferule 3, the adaptor housing 4, the plug body 5, the compression spring 6, the compression bonding sleeve 7 and the boot 8 described above are mounted on the optical fiber cable 1 in the following order.

First of all, the optical fiber cable 1 is covered with the heat shrinking tube 70. Next, the plug body 5, the compression coil spring 6, the compression sleeve 7 and the boot 8 are made to pass through the optical fiber cable 1.

Subsequently, the ferule 3 is mounted on the distal end of the optical fiber cable 1 and the ferule 3 is inserted into the adapter housing 4. Then, the plug body 5 is moved toward the adapter housing 4 and the plug body 5 is fixed to the adapter housing 4. As a result, the ferule 3 is hermetically fixed to the adapter housing 4 in a biased manner by the compression coil spring 6. Here, in such a state, the core wire 1B is exposed from the proximal end side of the plug body 5.

Next, the extending portion 53 of the plug housing 5A is covered with the high tensile strength wires 1C and the high tensile strength wires 1C are compression-bonded to the extending portion 53 using the compression sleeve 7. The method for compression-bonding the high tensile strength wires 1C to the extending portion 53 will be described later. Next, the compression bonding sleeve 7 is covered with the boot 8 and they are connected to each other by an adhesive agent.

Figure 2:
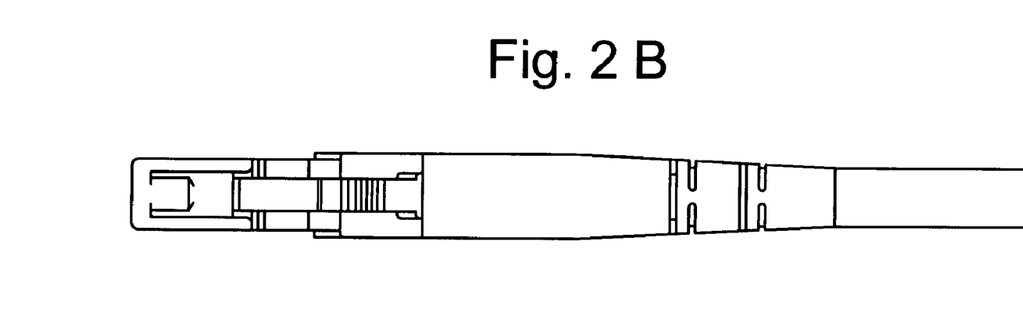
FIG. 2A is a side view of the optical plug according to the embodiment.
FIG. 2B is a plan view of the optical plug according to the embodiment.
FIG. 2C is a front view of the optical plug according to the embodiment.

FIG. 2A is a side view of the optical plug 2, FIG. 2B is a plan view of the optical plug 2, and FIG. 2C is a front view of the optical plug 2. Here, in FIG. 2A to 2C, the ferule 3 which is exposed from the adapter housing 4 and the optical fiber cable 1 which is exposed from the proximal end side of the boot 8 are omitted.

The adapter housing 4 is provided with a latch 40 which projects outwardly and is engaged with a connector not shown in the drawing. Further, on an upper portion of the plug body 5, a trigger 50 which is engaged with the distal end of the latch 40 of the adapter housing 4 is formed.

By pushing the trigger 50 downwardly, the latch 40 is resiliently deformed toward the inner side of the latch and hence, the latch 40 is disengaged from a state in which the latch 40 is locked to the connector not shown in the drawing.

Next, using a pair of dies 9A, 9B, a method for connecting the high tensile strength wires 1C of the optical fiber cable 1 to the extending portion 53 of the optical plug 2 is explained in conjunction with FIG. 3 to FIG. 6.

Figure 3:
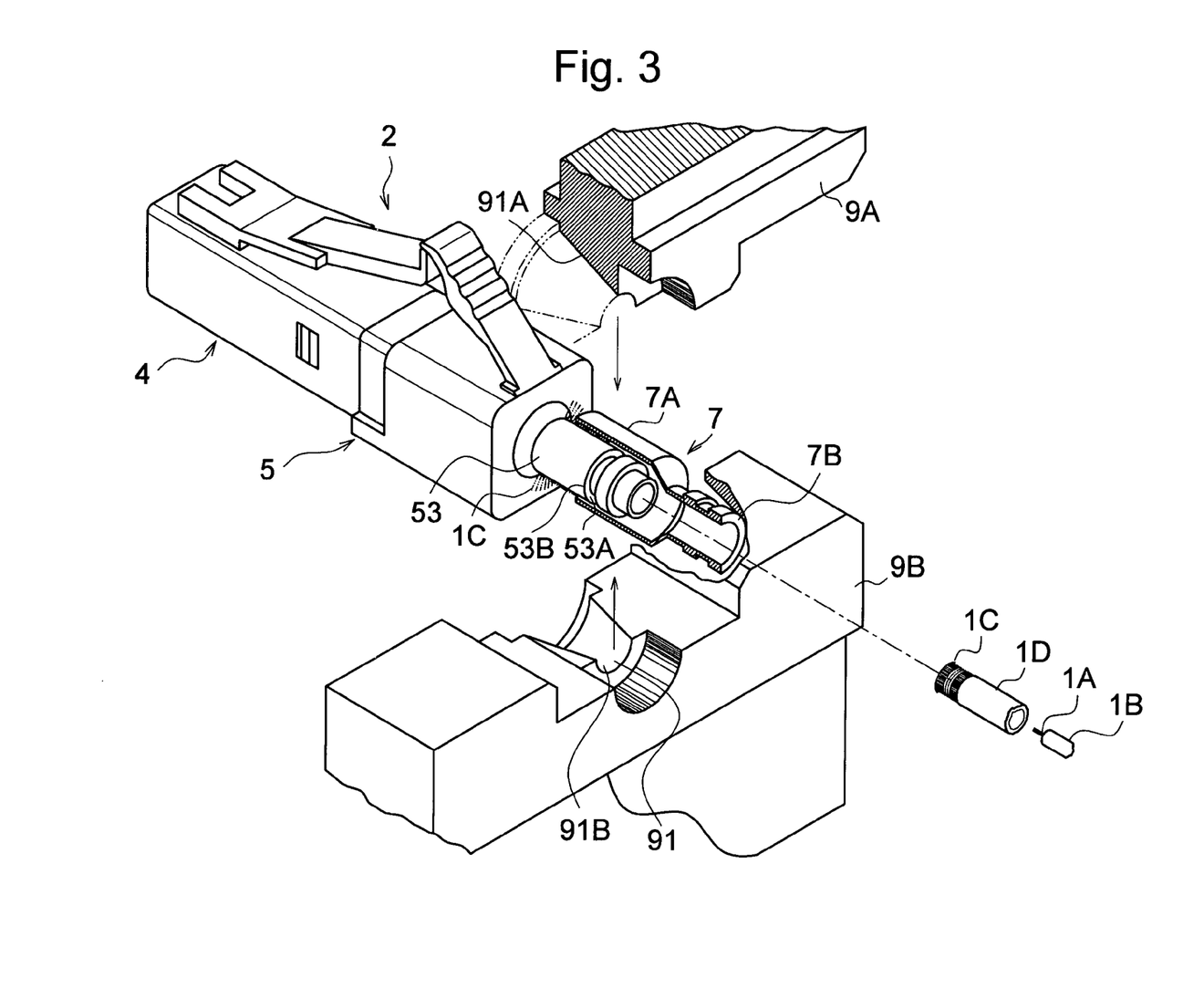
FIG. 3 is an exploded perspective view for explaining a method which performs compression bonding of the optical plug according the embodiment using a pair of dies.
Figure 4:
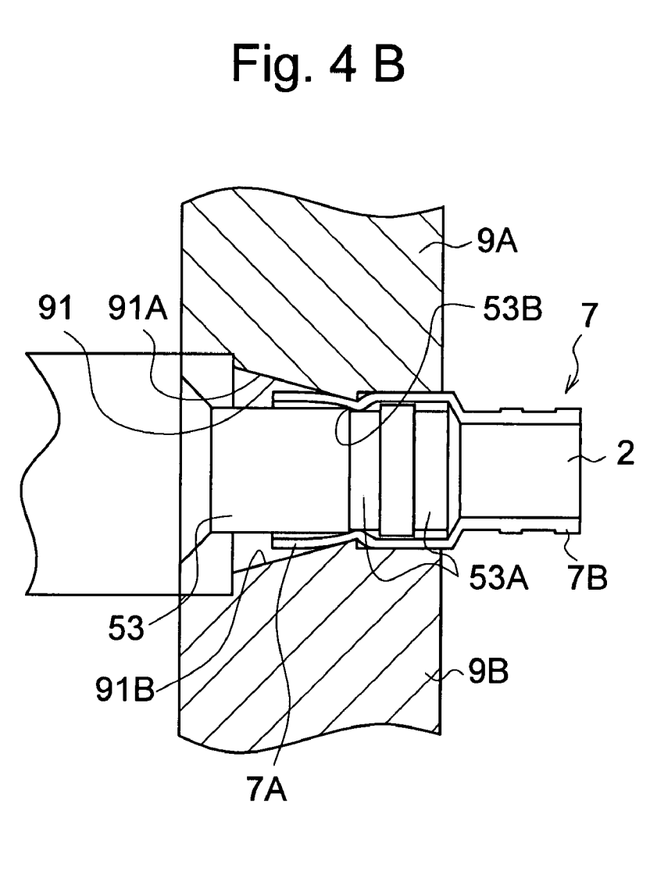
FIG. 4A is a partial cross-sectional view showing a state of the optical plug according to the embodiment before the compressing bonding.
FIG. 4B is a partial cross-sectional view showing a state of the optical plug according to the embodiment after the compressing bonding.

FIG. 3 is an exploded perspective view for explaining the method for compression-bonding the optical plug 2 using the pair of dies 9A, 9B.

In FIG. 3, the pair of dies 9A, 9B are vertically divided. However, the pair of dies may be divided horizontally.

In the pair of dies 9A, 9B, an approximately cone-shaped insertion hole 91 having a gentle gradient is formed. An inner surface of the insertion hole 91 is divided into a conical surface 91A at the die 9A side and a conical surface 91B at the die 9B side.

Here, the surface treatment such as buff polishing may be applied to the conical surfaces 91A, 91B of the insertion hole 91 which constitute pressure bonding surfaces. Further, these dies 9A, 9B may be mounted on a compression bonding tool or may be mounted on a press machine.

Figure 5:
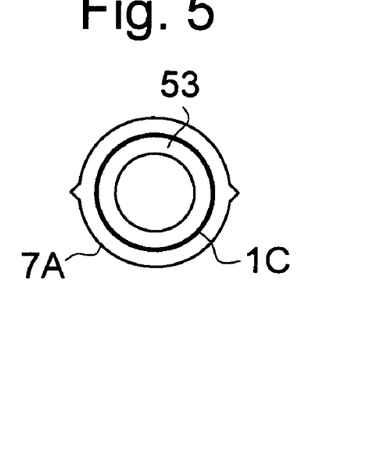
FIG. 5 is a front view showing the state of the optical plug according to the embodiment after the compressing bonding.
Figure 6:
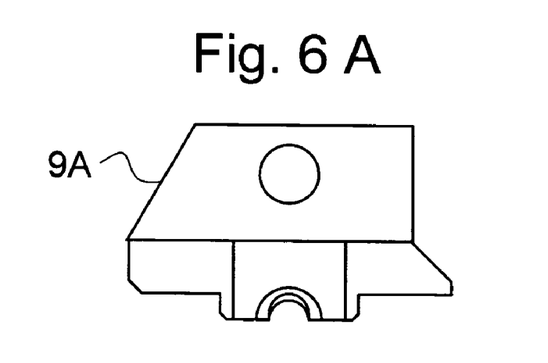
FIG. 6A is a front view of the die according to the embodiment.
FIG. 6B is a longitudinal cross-sectional view of the die according to the embodiment.
FIG. 6C is a front view of the die according to the embodiment.
FIG. 6D is a longitudinal cross-sectional view of the die according to the embodiment.

FIG. 4A is a partial cross-sectional view showing the optical plug 2 before compression bonding. FIG. 4B is a partial cross-sectional view showing the optical plug 2 after compression bonding. FIG. 5 is a front view showing a state of the optical plug 2 after compression bonding.

First of all, as shown in FIG. 4A, the dies 9A, 9B are opened and the optical plug 2 is arranged such that the annular grooves 53A of the extending portion 53 are positioned at the small-diameter side of the insertion hole 91.

Next, by closing the pair of dies 9A, 9B, as shown in FIG. 4B, the diameter of the crimp portion 7A of the compression bonding sleeve 7 is narrowed by the inner surface of the insertion hole 91 so that the crimp portion 7A compression-bonds the high-tensile strength wires 1C to the extending portion 53 of the plug body 5.

In this manner, when the diameter of the crimp portion 7A is narrowed and the crimp portion is deformed plastically, the inside of the crimp portion 7A and the stepped portion 53B at the outside of the extending portion 53 clamp the high tensile strength wires 1C.

Thereby, as shown in FIG. 5, the diameter of the crimp portion 7A is uniformly narrowed within the limit of its plastic deformation.

Specific sizes of the extending portion 53 of the plug body 5, the crimp portion 7A of the compression bonding sleeve 7 and the dies 9A, 9B are as follows.

FIG. 6A is a front view of the die 9A, FIG. 6B is a longitudinal cross-sectional view of the die 9A, FIG. 6C is a front view of the die 9B and FIG. 6D is a longitudinal cross-sectional view of the die 9B.

To be more specific, a gradient angle θ of the conical surfaces 91A, 91B which constitute the insertion hole 91 is set to approximately 10 degrees, for example. Further, the inner diameter "r" of small-diameter portions of the conical surfaces 91A, 91B is set to 3.1 mm, for example.

Further, the outer diameter and inner diameter of the crimp portion 7A of the compression bonding sleeve 7 are, for example, 3.7 mm and 3.3 mm respectively.

Further, the outer diameter of the extending portion 53 of the plug body 5 is 3.1 mm and the outer diameter of the annular grooves 53A is 2.8 mm.

Then, using the pair of dies 9A, 9B, the outer diameter of the crimp portion 7A of the compression bonding sleeve 7 is narrowed from 3.7 mm at least to 3.1 mm.

Figure 7A:
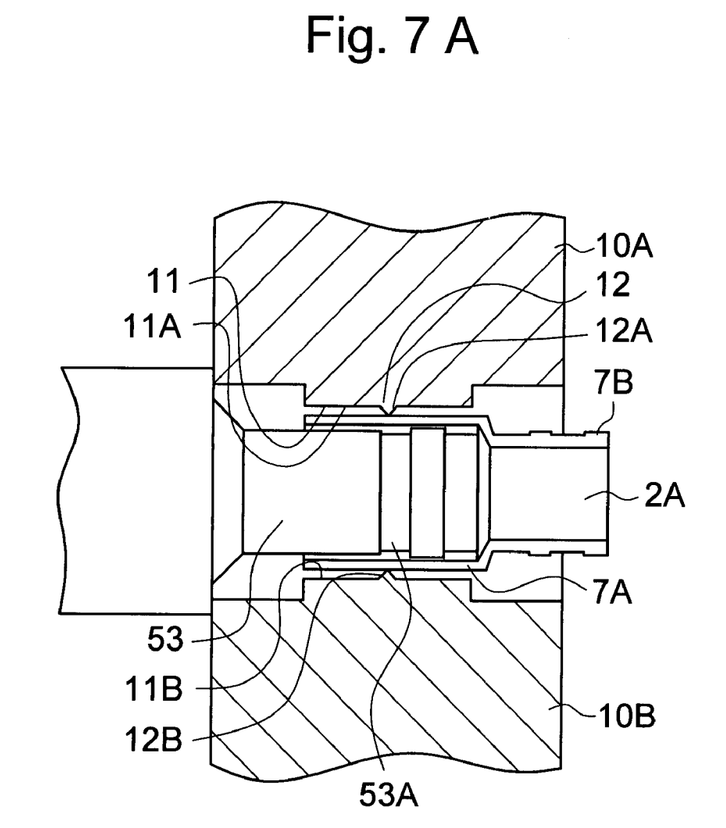
FIG. 7A is a partial cross-sectional view showing a state of an optical plug according to a conventional example before the compressing bonding.
Figure 7B:
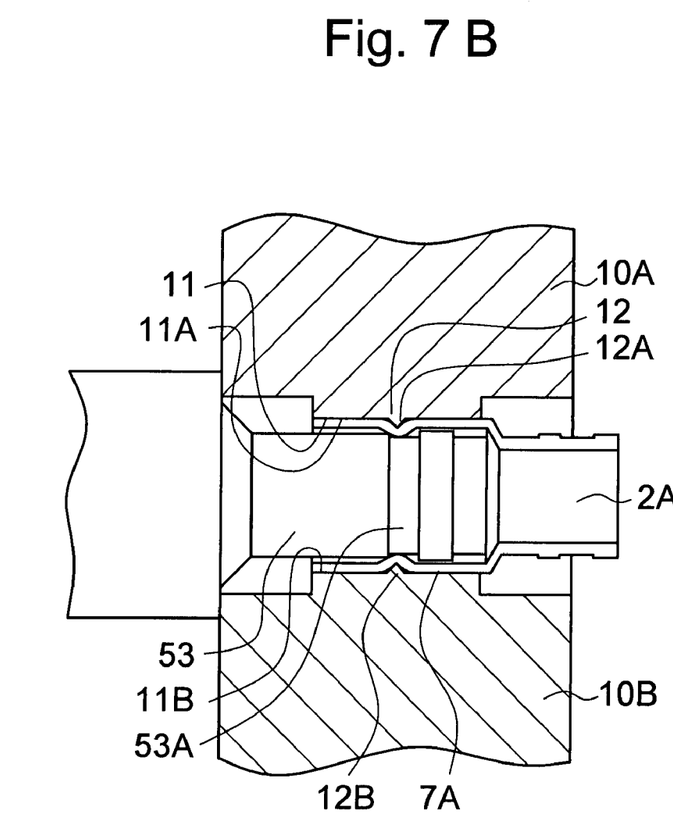
FIG. 7B is a partial cross-sectional view showing a state of an optical plug according to the conventional example after the compressing bonding.
Figure 8:
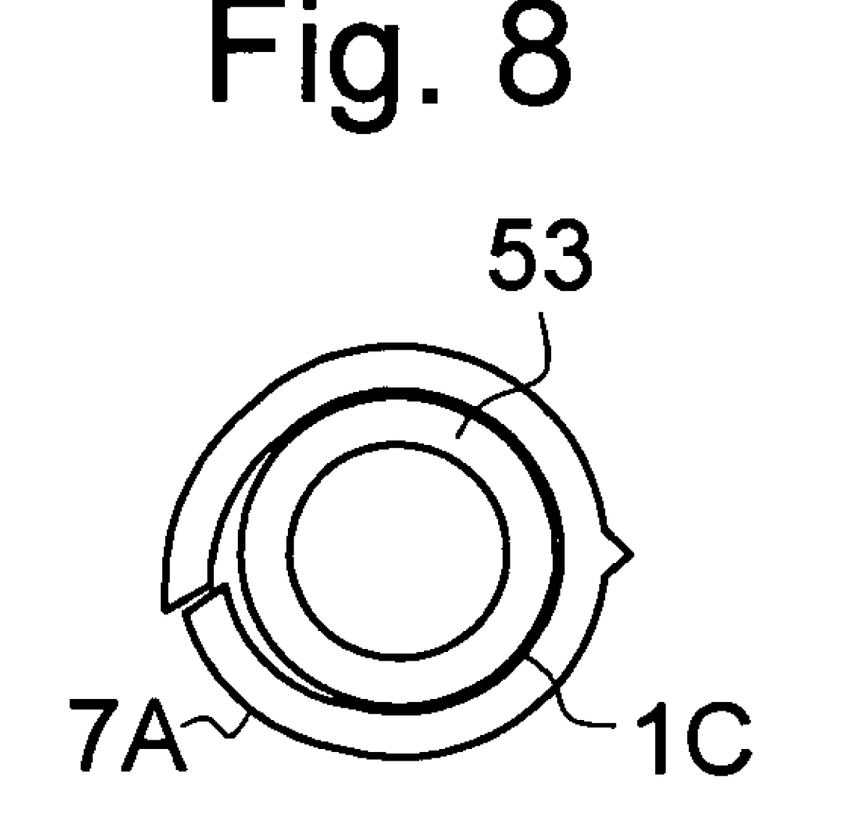
FIG. 8 is a front view showing a state of an optical plug according to the conventional example; after the compressing bonding.

FIG. 7A is a partial cross-sectional view showing a state of the optical plug 2A according to a conventional example before compression bonding, FIG. 7B is a partial cross-sectional view showing a state of the optical plug 2A after compression bonding, and FIG. 8 is a front view showing a state of the optical plug 2A after compression bonding.

An approximately cylindrical insertion hole 11 is formed in the dies 10A, 10B. On an inner surface of the insertion hole 11, a projection 12 which has a V-shaped cross section and extends annularly is formed.

The insertion hole 11 is divided into an arcuate surface 11A and a semi-circular arcuate projection 12A which extends in a semi-circular arcuate shape at the die 10A, and an arcuate surface 11B and a semi-circular arcuate projection 12B which extends in a semi-circular arcuate shape at the die 10B.

First of all, as shown in FIG. 7A, the dies 10A, 10B are opened and the optical plug 2A is arranged such that the annular grooves 53A of the extending portion 53 are positioned at the projection 12. Then, by closing the pair of dies 10A, 10B as shown in FIG. 7B, the diameter of the crimp portion 7A is partially narrowed by the projection 12 so that the crimp portion 7A compression-bonds the high tensile strength wires 1C to the extending portion 53 of the plug body 5. As a result, the crimp portion 7A exceeds the limit of plastic deformation and, as shown in FIG. 8, cracks and rapture are generated.

In this manner, according to this embodiment, following advantageous effects can be obtained.

Conventionally, when a portion of the crimp portion 7A is rapidly deformed plastically, causing the relative position between the projection 12 and the crimp portion 7A to become misaligned, the deformation of the crimp portion 7A exceeds the limit of its plastic deformation and there arises the possibility of the occurrence of cracks and rapture. As a result, the high tensile strength wires 1C of the optical fiber cable 1 easily are removed from the optical plug 2.

However, according to this embodiment, since the crimp portion 7A having a thin wall thickness can be uniformly compression-bonded to the stepped portion 53B of the plug body 5, the crimp portion 7A is deformed plastically following or tracing the shape of the stepped portion 53B. Accordingly, it is possible to maintain the deformation of the crimp portion 7A within the limit of its plastic deformation, whereby the occurrence of cracks and rupture can be prevented.

According to the present invention, the following advantageous effects can be obtained.

In using a pair of dies forming an approximately cone-shaped insertion hole, the dies are opened and the dies are arranged such that the annular grooves of the extending portion are located at the small-diameter side of the insertion hole. Thereafter, by closing the pair of dies, the diameter of the crimp portion of the compression sleeve is narrowed so that the crimp portion compression-bonds the high tensile strength wires to the extending portion of the plug housing.

In this manner, since the diameter of the crimp portion is narrowed and the crimp portion is deformed plastically, the high tensile strength wires are clamped between the inside of the crimp portion and the outside of the extending portion. Here, the diameter of the crimp portion is uniformly narrowed within the limit of its plastic deformation. Accordingly, it is possible to maintain the deformation of the crimp portion within the limit of its plastic deformation and hence, it is possible to prevent the occurrence of cracks and rupture, so that the optical plug can be miniaturized.

Further, since it is sufficient to merely form the approximately cone-shaped insertion hole in the pair of dies, it is unnecessary to form the conventional annular projections and hence, it is possible to mount the optical fiber cable to the optical plug at a low cost.

What is claimed is:

1. An optical plug for being mounted to an optical fiber cable including a fiber, a core wire which covers the fiber, high tensile strength wires which cover the core wire and an outer sheath which covers the high tensile strength wires, the optical plug comprising:

a tubular ferule which holds the fiber and the core wire of the optical fiber cable such that the fiber of the optical fiber cable is exposed from a distal end of the ferule;

a tubular adapter housing in which the distal end of the ferule is inserted;

a tubular plug body which includes a projecting portion which is inserted into the inside of the adapter housing and an extending portion in which a plurality of annular grooves are formed and which is covered with the high tensile strength wires of the optical fiber cable;

a compression coil spring which is formed in the inside of the projecting portion of the plug body and biases the ferule toward the adapter housing;

a tubular compression bonding sleeve which includes a crimp portion which covers the extending portion of the plug body from above the high tensile strength wires of the optical fiber cable and a support portion provided at a proximal end side of the crimp portion;

wherein the diameter of the crimp portion is uniformly narrowed, and the high tensile strength wires of the optical fiber cable are compression-bonded to the annular grooves of the extending portion of the plug body.

2. An optical plug mounting method for mounting an optical plug on an optical fiber cable including a fiber, a core wire which covers the fiber, high tensile strength wires which cover the core wire and an outer sheath which covers the high tensile strength wires, wherein the optical plug includes:

a tubular ferule which holds the fiber and the core wire of the optical fiber cable such that the fiber of the optical fiber cable is exposed from the distal end of the ferule;

a tubular adapter housing in which the distal end of the ferule is inserted;

a tubular plug body which includes a projecting portion which is inserted into the inside of the adapter housing and an extending portion in which a plurality of annular grooves are formed and is which is covered with the high tensile strength wires of the optical fiber cable;

a compression coil spring which is formed in the inside of the projecting portion of the plug body and biases the ferule toward the adapter housing;

a tubular compression bonding sleeve which includes a crimp portion which covers the extending portion of the plug body from above the high tensile strength wires of the optical fiber cable and a support portion provided at the proximal end side of the crimp portion;

wherein a pair of dies having an cone-shaped insertion hole is used, the dies are opened, the annular grooves of the extending portion are disposed at the small-diameter side of the insertion hole and, thereafter, by closing the pair of dies, the diameter of the crimp portion is narrowed so that the crimp portion compression-bonds the high tensile strength wires to the extending portion of the plug body.

3. The optical plug mounting method according to claim 2, wherein the outer diameter and inner diameter of the crimp portion of the compression spring are respectively 3.7 mm and 3.3 mm, the outer diameter of the extending portion of the plug body is 3.1 mm, and the outer diameter of the annular grooves is 2.8 mm, and with the pair of dies, the outer diameter of the crimp portion of the compression bonding sleeve is narrowed to at least 3.1 mm.

4. The optical plug mounting method according to claim 2 or 3, wherein a gradient angle of an inner surface of the insertion hole of the dies is approximately 10 degrees.

* * * * *